United States Patent [19]

Gockel

[11] Patent Number: 4,498,995
[45] Date of Patent: Feb. 12, 1985

[54] LOST CIRCULATION DRILLING FLUID

[76] Inventor: Judith Gockel, 15511 Baldswelle, Tomball, Tex. 77375

[21] Appl. No.: 510,413

[22] Filed: Jul. 1, 1983

Related U.S. Application Data

[62] Division of Ser. No. 291,261, Aug. 10, 1981, Pat. No. 4,460,052.

[51] Int. Cl.$^3$ .................. C09K 7/04; E21B 33/138
[52] U.S. Cl. ................. 252/8.5 LC; 166/292; 175/72; 252/8.5 B
[58] Field of Search .......... 252/8.5 LC, 8.5 B, 8.5 A; 106/97, 98; 166/292, 283; 175/72

[56] References Cited

U.S. PATENT DOCUMENTS

| | | | |
|---|---|---|---|
| 2,695,669 | 11/1964 | Sidwell | 252/8.5 LC |
| 2,856,354 | 10/1958 | Armentrout | 252/8.5 LC |
| 2,861,636 | 11/1958 | Messenger | 252/8.5 LC |
| 3,208,523 | 9/1965 | Coyle et al. | 175/72 |
| 3,219,111 | 11/1965 | Armentrout | 252/8.5 LC |
| 3,557,876 | 1/1971 | Tragesser | 175/72 |
| 4,014,394 | 3/1977 | Bailey | 252/8.5 LC |
| 4,173,999 | 11/1979 | Messenger | 175/72 |
| 4,235,291 | 11/1980 | Messenger | 166/292 |
| 4,261,422 | 4/1981 | White et al. | 166/305 R |
| 4,275,788 | 6/1981 | Sweatman | 166/295 |
| 4,405,468 | 9/1983 | Haun, Jr. | 252/8.5 B |
| 4,460,052 | 7/1984 | Gockel | 175/72 |

FOREIGN PATENT DOCUMENTS 564841 10/1958 Canada .................. 252/8.5 LC

*Primary Examiner*—Ben R. Padgett
*Assistant Examiner*—Howard J. Locker
*Attorney, Agent, or Firm*—Neal J. Mosely

[57] ABSTRACT

A drilling mud, or other drilling fluid containing particulate expanded aggregates is effective to seal the fractures and openings and prevent lost circulation of the mud or fluid in a well. The expanded aggregates used are inorganic clays, shales and slates which are heat treated at temperatures up to about 3000° F. to produce an expanded lattice structure having a series of interconnecting passages. The expanded aggregates are added to any conventional drilling mud, or other drilling fluids, either water-based or oil-based, in an amount sufficient to stop the fractures and openings in the formation. The proportion of the aggregates in the drilling mud, or other drilling fluid, will be varied as needed and will usually range from 1-33 parts by weight per 100 parts by weight of drilling mud. Water-based and oil-based drilling muds containing expanded aggregates are novel compositions.

9 Claims, No Drawings

LOST CIRCULATION DRILLING FLUID

CROSS REFERENCE TO RELATED APPLICATIONS

This application is a division of copending application Ser. No. 291,261, filed Aug. 10, 1981, now U.S. Pat. No. 4,460,052, issued July 17, 1984.

BACKGROUND OF THE INVENTION

1. Field of the Invention

This invention relates to a improves lost circulation drilling fluid.

2. Description of the Prior Art

In the drilling of wells in the earth, various types of drilling mud, or other drilling fluid, are used to remove cuttings from the well and for a variety of other purposes. One problem which occurs from time to time is the loss of circulating drilling mud, or other drilling fluid, into cracks and fissures or overly porous formations deep in the earth. A variety of additives have been developed in an attempt to solve the problem of "lost circulation" and "thief formations". Examples of various "lost circulation" additives and other methods of treating lost circulation zones and "thief formations" are disclosed in the following prior art patents:

Sidwell U.S. Pat. No. 2,561,075 discloses the use of expanded volcanic rock particles as "lost circulation" additives in drilling mud, or other drilling fluid. These materials, however, are very fragile and form a poor seal in porous formations.

Armentrout U.S. Pat. No. 2,648,522 discloses the use of coarse aggregate (gravel) and expanded perlite in drilling mud, or other drilling fluid, to bridge the space between the particles of aggregate in sealing a porous formation.

Armentrout U.S. Pat. No. 3,219,111 is concerned with the problem of lost circulation and uses an expanded marine shale, having a closed, hermetically sealed, porous structure, as a mud, or other drilling fluid, additive.

Coyle U.S. Pat. No. 3,208,523 utilizes Attapulgite clay as a lost circulation additive for drilling mud, or other drilling fluid.

Sauber et al. U.S. Pat. No. 3,253,664 uses a mixture of asbestos and diatomite as a lost circulation additive in a drilling mud, or other drilling fluid.

Cox U.S. Pat. No. 3,568,782 discloses the use of popcorn as a lost circulation additive for drilling mud, or other drilling fluid.

Messenger U.S. Pat. No. 3,724,564 and Kelly U.S. Pat. No. 3,724,565 disclose the introduction of an aqueous mixture of a dispersing agent, an inert particulate material and a water dispersible oleophilic colloid into a well to stop lost circulation.

Taylor U.S. Pat. No. 3,788,405 uses organic materials such as straw, wood fiber, nut shells, etc. as lost circulation additives for drilling mud, or other drilling fluid.

Messenger U.S. Pat. No. 3,788,406 uses an oil wettable granular material, e.g. Gilsonite or ground coal, as a lost circulation additive.

Hessert U.S. Pat. No. 3,818,998 utilizes cellulose ethers, polysaccharides and polyacrylamides cross linked to a gel structure as lost circulation additives.

Messenger U.S. Pat. No. 3,987,855 uses an oil wettable dispersing agent and barite as lost circulation additives.

Bailey U.S. Pat. No. 4,014,394 uses a magnesium oxide/bentonite slurry at a pH less than 9.7 in a drilling mud, or other drilling fluid. The additive swells under conditions of use to plug the formation.

SUMMARY OF THE INVENTION

It is an object of this invention to reduce lost circulation of drilling mud, or other drilling fluid, during the drilling of a well.

It is another object of the invention to provide an improved method of treating subterranean formations to reduce lost circulation of drilling mud, or other drilling fluid.

Still another object of the invention is to provide new and improved lost circulation additives for oil-base and water-base drilling mud, or other drilling fluid.

Still another object of the invention is to provide new and improved drilling mud, or other drilling fluid, compositions which are resistant to loss into porous subterranean formations.

Other objects of the invention will become apparent throughout the specification and claims as hereinafter related.

The above stated objects of the invention are attained by a method of sealing fractures and openings in an earth formation traversed by a well bore which comprises adding a material meeting the above criteria to a drilling mud, or other drilling fluid, circulating through the well bore. The additive material used is an expanded aggregate. These expanded aggregates seal the fractures and openings and prevent lost circulation of the drilling mud, or other drilling fluid.

The expanded aggregates used are inorganic clays, shales and slates which are heat treated at temperatures up to about 3000° F. to produce an expanded permeable lattice structure having a series of interconnecting passages.

The expanded aggregates are added to any conventional drilling mud, or other drilling fluid, either water-based or oil-based, in an amount sufficient to stop the fractures and openings in the formation. The proportion of the aggregates in the drilling mud, or other drilling fluid, will be varied as needed and will usually range from 1-33 parts by weight per 100 parts by weight of drilling mud, or other drilling fluid. Water-based and oil-based drilling mud, or other drilling fluid, containing expanded aggregates are novel compositions representing another embodiment of the invention.

SETTING OF THE INVENTION

In the drilling of well bores with modern rotary well drilling apparatus and methods, the bore hole is normally kept filled with clean circulating drilling mud, or other drilling fluid, which washes and flushes the cuttings removed by the rotary bit from the bottom of the well bore. Drilling muds, or other drilling fluids, are pumped under pressure down the interior of the drill pipe and are forced out through openings in the drill bit, providing lubrication and wetting of the exposed surface, which increases the efficiency of the bit. The fluid then lifts the rock cuttings produced by the bit away from it and carries them up the annulus outside the string of drill pipe.

As the drilling mud, or other drilling fluid, passes up the annulus, it deposits a film or cake on the walls of the surrounding formation. This film or cake serves to seal small cracks or fissures, circa. 0.001–0.002" size, in the formation and also decreases friction on the rotating string of drill pipe. The rock cuttings which are carried to the surface by the drilling mud, or other drilling fluid, are removed from the mud, or other drilling fluid, by various types of separators, e.g. shaker screens, centrifugal filtering systems, desilters, etc. The cleaned drilling mud, or other drilling fluid, is then recirculated.

Conventional drilling muds, or other drilling fluids, are of varied composition, depending upon the needs of the particular drilling operation. While most drilling muds are mixtures of fresh water with various clays, such as expansible bentonite clay, native clay and attapulgite clay, such muds may contain salt water, oil, oil emulsions, synthetic materials, such as polymeric additives, or combinations of such materials. The term "drilling mud", as used herein, includes conventional drilling muds, and equivalent drilling fluids of the slurry type, such as cement slurries.

Additional components are often added to drilling muds to impart desired characteristics, such as added weight or increased viscosity. These components may function physically, as in the case of barite, which is added to increase weight; or chemically, as in the case of sulfuric acid or hydrofluoric acid as a deflocculent. The more complex drilling muds can be very costly and their loss can mean a substantial increase in the cost of drilling a well.

The particle size in common drilling muds is, as general rule, from about 0.5 to 5 microns, with a small percentage (perhaps as much as 5%) of the particles being as large as 325 mesh (44 microns). The balance of the particles above this range are removed in process of preparation and in separation of the rock cuttings prior to recirculation of the mud. Because of the constant cleaning and removal of larger particles, the drilling mud can bridge only very small fissures (less than 0.002 in.) within the formations as the muds are normally used.

When the formation penetrated by the well bore has openings or fissures larger than about 0.001–0.002", the ordinary drilling muds will flow into the openings and escape from the well bore into the formation. This loss of drilling mud may be slow or rapid depending upon the degree of porosity or the size of the fissures or fractures in the formation. In more severe cases the loss of fluid may result in a drop in the hydrostatic head to the point of hydraulic pressure equalization, which may fall thousands of feet below the surface.

In this instance, several conditions may occur which endanger the drilling operation and result in considerable economic loss. In normal circumstances, the column of drilling mud assists in supporting the wall of the well bore. Therefore, when a well bore is partially or completely emptied of drilling mud, the well bore walls are deprived of the hydraulic pressure head of the column of drilling circulation fluid extending downward from the surface, and consequently there will be hundreds or even thousands of feet of unsupported well wall that will be free to slough off and to cave into the well bore. That sloughing off or caving in may stick or freeze drill pipe that may be in the well bore or casing that may be therein and which is in the process of being installed and cemented. This condition is at times so severe that wells have been abandoned, or must be redrilled, because of it.

Additionally, the drilling mud is weighted to accomodate the depth of hole which has been drilled. This is done to minimize the danger of unequal pressures allowing a formation to release a bubble of gas, or a surge of oil or water toward the surface, causing a blowout of the well.

When drilling mud is lost in a well bore, the formation penetrated may be under great pressure which, if sufficient to overcome the static head of drilling mud remaining in the well bore, will cause a blowout, endangering the well, the financial investment in it, and the lives and safety of the personnel on site.

Where casing is being installed and cemented in place or cement plugs are being installed or other cementing operations are taking place, Portland cement slurries are often employed and these slurries likewise become lost through porous or fractured formations penetrated by the well bore.

As oil and gas well are being drilled to progressively greater depths in the earth the problem or preventing or curing lost circulation becomes increasingly difficult largely due to the high differential in pressures encountered in the formations penetrated by deep wall bores.

Where the well bore has penetrated depleted porous oil and gas formations and the pressures therein have become largely exhausted, the differential pressures may be 10,000 p.s.i. on the borehole side, forcing the drilling mud or cement slurries into the porous formations.

Lost circulation of drilling fluids has been a problem since the earliest days of well drilling. Many methods have been tried to solve the problem and many materials have been used as additives for preventing lost circulation.

In Table 1, there is a list of lost circulation additives which are currently in commercial use. The materials can be classified in three major categories involving three theories of bridging fractures and fissures in lost circulation zones. The materials are labeled O (for organic) or I (for inorganic), as there are examples of both types of materials in each category listed.

TABLE 1

| COMMERCIALLY AVAILABLE LOST CIRCULATION ADDITIVES | | |
| --- | --- | --- |
| A. FLAKES | B. FIBERS | C. GRANULAR |
| leather flakes (O) | bagasse (O) | walnut shells (O) |
| mica flakes (I) | cedar fiber (O) | pecan shells (O) |
| cellophane-flakes (O) | pig hair (O) | almond shells (O) |
| | sunflower seed-hulls (O) | ground coal (I) |
| | | perlite (I) |
| | cotton seed-hulls (O) | diatomaceous-earth (I) |
| | wood shavings (O) | limestone (I) |
| | excelsior (O) | vermiculite (I) |
| | asbestos (I) | granular barite (I) |
| | blended fibers (O) | |

Category A, plating flakes, are marketed and used on the theory that the flakes will plate on the surface of a zone of lost circulation, each flake overlaying the next, and being held in place by the clay particles in the drilling mud.

While this method has some limited utility in areas of low pressure differential or in formations where circulation is lost through small cells or fissures (not exceeding 0.10" in size), it has neither the inherent strength necessary to function in more usual situations, nor does it actually plate in most instances. Materials of a flake nature are more likely to slip sideways into the formation and lodge in that position. Also, since flake materials are quite fragile in most instances, they gradually crumble under the fluid pressure and become largely useless. The organic flakes, while being less fragile, are subject to extreme and rapid deterioration resulting from heat and pressure and the chemicals present in most drilling muds.

Category B, the fibrous additives, function by felting themselves on the walls of the well bore, creating a mat of fibers with which the clay or other viscous particles cooperate in creating a seal. These materials, too, are subject to loss through the interstices of the formation. With the exception of asbestos, these materials are organic and subject to deterioration by the conditions discussed above. Even asbestos is not satisfactory, since it is hazardous physiologically and its use has been largely restricted. Asbestos also suffers from structural weakness and a tendency to slip sideways into the interstices of the loss zone. Another disadvantage of these materials is that the fiber mat which is formed is subject to being knocked loose by the drill string once drilling activity is resumed, recreating a loss of circulation at the same site.

Category C, the granular materials, are usually marketed in several different sizes, which permits them to be mixed together or to be used successively in attempting to overcome a lost circulation situation. These materials function by being carried into the formation where circulation is being lost. The granules lodge in the formation, creating a bridge, which, in turn, provides a lodging place for other, smaller particles. Ideally, this is the best way to arrest circulation loss. Unfortunately, the organic materials in this category are subject to the same deterioration as the organic materials in the other categories discussed above. The inorganic materials in this category are all structurally weak, which weakness allows them to be crushed by the fluid pressure and washed away into the porous or fissured formation. Most of these materials are so fragile that they can be crushed between the fingers.

MATERIALS USED IN THIS INVENTION

As the function of the granular lost circulation additives is the most effective in permanently sealing off a zone of lost circulation, it would be desirable to provide a material of this type which is not subject to the disadvantages discussed above. A superior granular additive should be a material capable of withstanding the heat and pressure, and the chemical additives found in the well bore.

It should also have the unique ability to contain within itself portions of the clay or other viscosifier present in the drilling mud or other drilling fluid, while temporarily giving up the water or other liquid component of the fluid, thus producing, not only the bridge effect created by the granular form, but also a firm and indestructible seal within the formation itself, based on the adhesion of the viscosifier to itself.

Materials having these properties are found among a group of materials known collectively as expanded aggregates, the raw materials for which are clay, clay-shale, and slate. The expanded aggregates are produced by heating clay, clay-shale, or slate in rotary kilns at temperatures up to about 3000° F. The heat treatment expands the raw material on the same principle as popping corn. The heat treatment creates within the material an expanded permeable lattice structure which is partially open, permitting passage of fluids and the accumulation of solids (e.g. clay particles) within the interior pores and interconnecting passages.

The expanded aggregates should not be confused with expanded volcanic rock or expanded marine shale which have substantially different structures, notably a closed porous structure which is not permeable and open. The expanded aggregates when added, in proportions of about 1–33 parts per 100 parts drilling fluid, to conventional drilling muds, both oil-based and water-based, and to other drilling fluids are superior to other lost circulation additives of the prior art.

The expanded aggregates have a number of physical advantages for use in arresting lost circulation. These materials are structurally strong and fully capable of withstanding the pressures encountered in modern drilling. These materials, because of their expanded, open, porous structure are capable of trapping clays or other viscosifiers and permit the passage of water until a physical/chemical bond has been formed, sealing the circulation loss site. These materials are also chemically inert and will not react with chemicals or other components encountered in the drilling operation.

The expanded aggregates have the further advantage of being easy to wet, and the particles will stay in suspension indefinitely. The expanded aggregates, therefore, require little or no special mixing or handling which has been a source of considerable expense and/or difficulty encountered with many other lost circulation materials. Additionally, the expanded aggregates have the advantage that they present no health or environmental hazards.

The expanded aggregates possess features of convenience and utility not found in other lost circulation additives. They are not damaged by accidental wetting and can be introduced into the mud system in the wet or dry state without materially affecting their utility. Storage is vastly simplified by this property. It is not necessary to mix and handle a separate lost circulation unit, as the material is readily recoverable from the drilling fluid (mud) by the standard shaker screens and centrifugal filtering systems used for removing rock cuttings.

Another unique feature of the expanded aggregates is their adaptation to the weight of the drilling mud being used due to their inherent internal structure. To test this characteristic, equal volumes of expanded aggregate and a standard (8.5 lb./gal.) mud were mixed together, stirring for about 10 sec. manually. The mixing of 500 cc. mud with 500 cc. expanded aggregate produced 731 cc. of the mixture.

As the aggregates do not expand or contract under any conditions other than the pressure sufficient to crush them (i.e. 3000 psi dry and 10,000 psi in a hydraulic system), this demonstrates the effectiveness of the mixture. There was no settling of the expanded aggregate after 14 days storage without further agitation. The observations were made in glass vessels for ease of monitoring. The mixture was homogeneous, fluid, and pumpable, even at these concentrations.

DESCRIPTION OF THE PREFERRED EMBODIMENTS INCLUDING COMPARISONS WITH CONTROLS AND PRIOR ART ADDITIVES THE TEST PROCEDURE AND EQUIPMENT

In testing the expanded aggregates as lost circulation additives, and in comparisons with controls and with prior art types of additives, conventional test equipment was used which simulates the conditions of a lost circulation zone. The tests were carried out using a 350 ml. steel-walled test cylinder having removable fittings for assembly and disassembly. The cylinder can be sealed and placed under any selected pressure.

Within the cylinder, there can be placed, according to the requirements of the test, a slotted plate (equivalent to a badly fractured formation), and/or different sizes of screens, and layers of gravel or other coarse aggregate, coarse or fine sand, etc. (to approximate less porous conditions). The regular drilling mud (as control) or a regular drilling mud plus additives (either prior art additives or the additives of this invention) was introduced to the cylinder and placed under pressure. A measuring cup was placed under the cylinder to measure fluid leakage past the slotted plate and/or screen.

PREPARATION OF LOST CIRCULATION MUD COMPOSITIONS

The expanded aggregates are easily mixed into mud compositions. These materials can be mixed directly into the circulating mud system of an ongoing well operation, or, if desired, can be mixed separately to produce a "slug" of higher concentration to be used as a squeeze and spotted directly the site of lost circulation. These materials function well in either application.

Up to this point, the application of the expanded aggregates has been described as lost circulation additives for drilling muds. Another technique used to stop lost circulation involves the use of a cement slurry which is spotted, as a slug, directly to the lost circulation zone. The expanded aggregates are equally effective when used in cement slurries at about the same concentrations at which other extenders or lost circulation additives are used, and are quite effective in preventing the loss of the cement into the lost circulation zone.

The expanded aggregates used for this purpose are obtained from a number of locations around the world and the source is not critical so long as the materials are of the type discussed above and manufactured as described. Different grades of these materials have different weights, according to the size of the particles in each respective grade. The expanded aggregates have densities ranging from 42 to 75 lbs. per 2 cu.ft.-bag. These materials will be supplied in 2 cu.ft. bags or 50 lb. bags (standard bag sizes for other commercially available additives) depending upon the supplier. This size container is easily handled under normal conditions of use which is a further advantage to its use in drilling operations.

The expanded aggregates will be supplied (and have been tested) in several basic gradations by particle size.
Grade #1 4×0—particles ¼" to 0.02 mm. or less—fine
Grade #2 ⅜×0—particles ⅜" to 0.02 mm. or less—med.
Grade #3 ¾" to ⅜"—coarse These gradations are based on a classification by conventional screening techniques. In addition to these grades, another material will be available called "fines", consisting entirely of particle sizes less than 0.05 mm. Other sizes may be provided as needed, including sizes intermediate to the ones listed above. The "fines" are available from a deposit in South Central Texas and other deposits on the southeast coast of the United States. This material assists in creating a smooth lubricating surface on the well bore, as well as sealing the final small interstices where necessary. This material is particularly useful in sand zones, as it can be circulated with the drilling mud to seal the zone as it is being drilled.

EXAMPLE 1

Evaluating A Control

Tests were carried out on a standard drilling mud having a density of 8.5 lb./gal. The test cylinder described above was provided with a 60 mesh screen in the base of the cylinder. The cylinder was filled with the drilling mud, sealed and pressurized to 120 psi. In five minutes, substantially all of the mud had passed through the screen with only a few aggregated clay particles larger than 60 mesh retained on the screen.

EXAMPLE 2

Evaluating Prior Art Additives

Tests were carred out on a standard drilling mud having a density of 8.5 lb./gal. To 350 ml. of the mud, there was added and mixed in 20 g. of a lost circulation material to be evaluated.

The test cylinder described above was provided with a 60 mesh screen in the base of the cylinder. The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate.

Using bagasse as the additive, there was an initial surge of mud for the first 15–20 sec. followed by a continuous slow dripping of mud for the 10 min. duration of the test. At the end of the test, 112 ml. of mud was collected which had passed through the test cylinder.

Using mixed nut hulls of various grades as the additive, there was an initial surge of mud for several seconds followed by a continuous slow dripping of mud for the 10 min. duration of the test. At the end of the test, 131 ml. of mud was collected which had passed through the test cylinder.

EXAMPLE 3

Evaluating Expanded Aggregate Additives

Tests were carried out on a standard drilling mud having a density of 8.5 lb./gal. To 350 ml. of the mud, there was added and mixed in 20 g. of an expanded aggregate as a lost circulation material to be evaluated.

The test cylinder described above was provided with a 60 mesh screen in the base of the cylinder. The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate.

Using Grade #1 (fine) expanded aggregate (expanded clay) as the additive, there was an initial surge of mud for the first 5–10 sec., changing rapidly from mud to thin filtrate, followed by an occasional slow dripping (about 30 sec. intervals) of clear filtrate for the 10 min. duration of the test. At the end of the test, 49 ml. of filtrate was collected which had passed through the test cylinder.

Using Grade #2 (medium) expanded aggregate (expanded clay) as the additive, there was an initial surge of mud for the first 10 seconds, changing rapidly from mud to thin filtrate, followed by an occasional slow dripping (about 25–30 sec. intervals) of clear filtrate for the 10 min. duration of the test. At the end of the test, 68 ml. of filtrate was collected which had passed through the test cylinder.

Similar results are obtained when like grades of expanded clay-shale or expanded slate are substituted as the expanded aggregate used as a lost circulation additive.

EXAMPLE 4

Evaluating A Control-Different Test Conditions

Tests were carried out on a standard drilling mud having a density of 8.5 lb./gal. The test cylinder described above was provided with a 60 mesh screen in the base of the cylinder. A slotted insert (slot $\frac{1}{8}'' \times 2''$) was placed in the bottom of the cylinder above the base screen. The cylinder was filled with the drilling mud, sealed and pressurized to 120 psi. In five minutes, substantially all of the mud had passed through the screen with only a few aggregated clay particles larger than 60 mesh retained on the screen. There was no particle retention on the slot.

EXAMPLE 5

Evaluating Prior Art Additives-Different Conditions

Tests were carried out on a standard drilling mud having a density of 8.5 lb./gal. To 350 ml. of the mud, there was added and mixed in 20 g. of a lost circulation material to be evaluated.

The test cylinder described above was provided with a 60 mesh screen in the base of the cylinder. A slotted insert (slot $\frac{1}{8}'' \times 2''$) was placed in the bottom of the cylinder above the base screen. The cylinder was disassembled after each test to note whether the additive material tested had sealed on the slot or had passed through the slot and sealed on the screen.

The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate.

Using bagasse as the additive, there was an initial surge of mud followed by a continuous slow dripping of mud for the 10 min. duration of the test. There was some retention on the slot, but most retention was on the screen. At the end of the test, 43 ml. of mud was collected which had passed through the test cylinder.

Using mica flakes (fine) as the additive, there was an initial surge of mud for several seconds followed by a continuous slow dripping of mud for the 10 min. duration of the test. The entire screen surface was saturated with mud and mica. Retention was almost entirely on the screen. At the end of the test, 27 ml. of mud was collected which had passed through the test cylinder.

Using nut hulls (mixed types and grades) as the additive, there was an initial surge of mud for several seconds followed by a continuous slow dripping of mud for the 10 min. duration of the test. Retention was almost entirely on the slot, with little on the screen. At the end of the test, 88 ml. of mud was collected which had passed through the test cylinder.

EXAMPLE 6

Evaluating Expanded Aggregate Additives Different Conditions

Tests were carried out on a standard drilling mud having a density of 8.5 lb./gal. To 350 ml. of the mud, there was added and mixed in 20 g. of an expanded aggregate as a lost circulation material to be evaluated.

The test cylinder described above was provided with a 60 mesh screen in the base of the cylinder. A slotted insert (slot $\frac{1}{8}'' \times 2''$) was placed in the bottom of the cylinder above the base screen. The cylinder was disassembled after each test to note whether the additive material tested had sealed on the slot or had passed through the slot and sealed on the screen.

The cylinder was filled with the drilling mud, sealed and pressurized to 120 psi, and the resulting filtrate was collected in the measuring cup to determine its volume and characteristics. Notes were made as to the consistency of the liquid, i.e. whether it was actually mud or a dilute filtrate.

Using Grade #1 (fine) expanded aggregate (expanded clay) as the additive, there was an initial few drops of mud for the first second, followed by one to four drops of clear filtrate over a 30 sec. interval and no additional filtrate for the 10 min. duration of the test. At the end of the test, 7 ml. of filtrate was collected which had passed through the test cylinder. The slot was completely plugged and the only mud on the screen was directly below the slot.

Using Grade #2 (medium) expanded aggregate (expanded clay) as the additive, there was an initial surge of mud for the first few seconds, changing rapidly from mud to thin filtrate. with no additional filtrate loss for 10 min. duration of the test. At the end of the test, 11 ml. of filtrate was collected which had passed through the test cylinder. The slot was completely plugged and the only mud on the screen was directly below the slot.

Similar results are obtained when like grades of expanded clay-shale or expanded slate are substituted as the expanded aggregate used as a lost circulation additive.

EXAMPLE 7

Additional Comparative Tests

Additional tests were run in the apparatus as described in Examples 4–6, using the slotted insert, and following the same procedures, to compare the expanded aggregates with various commercially used additives for reducing lost circulation. The results are set forth in Table 2. below.

TABLE 2

COMPARATIVE TESTS WITH SLOTTED INSERT IN TEST CYLINDER

| COMMERCIAL ADDITIVES | | GRADE #1 AGGREGATE | |
|---|---|---|---|
| FILTRATE | CAKE | FILTRATE | CAKE |
| FIBERS | | | |
| Cottonseed-hulls (fine) | 148 ml. | on screen soft | 8 ml. | firm on slot |
| blended fibers (mixed) | 53 ml. | in slot 1" disp. on screen semi-soft | 11 ml. | firm on slot |
| cedar fiber (fine) | 48 ml. | in slot 1¼ disp. on screen semi-soft | 7 ml. | firm on slot |
| FLAKES | | | |
| Cellophane | 66 ml. | in slot 1" disp. on screen semi-firm | 8 ml. | firm on slot |
| GRANULAR | | | |
| PERLITE | 22 ml. | in slot | 8 ml. | firm |

TABLE 2-continued

COMPARATIVE TESTS WITH SLOTTED INSERT IN TEST CYLINDER

| COMMERCIAL ADDITIVES | | GRADE #1 AGGREGATE | |
|---|---|---|---|
| FILTRATE | CAKE | FILTRATE | CAKE |
| 4 × 0 | ¼" disp. on screen semi-firm | | on slot |

EXAMPLE 8

Evaluating A Control-Different Test Conditions

Tests were carried out on a standard drilling mud having a density of 8.5 lb./gal. The test cylinder described above was provided with a 60 mesh screen in the base of the cylinder. A bed (1 in. deep) of ⅛" diameter steel shot was placed in the bottom of the cylinder on the base screen. The cylinder was filled with the drilling mud, sealed and pressurized to 120 psi. In five minutes, substantially all of the mud had passed through the screen with only a few aggregated clay particles larger than 60 mesh retained on the screen.

EXAMPLE 9

Evaluating Prior Art Additives-Different Conditions

Tests were carried out on a standard drilling mud having a density of 8.5 lb./gal. To 350 ml. of the mud, there was added and mixed in 20 g. of a lost circulation material to be evaluated.

The test cylinder described above was provided with a 60 mesh screen in the base of the cylinder. A bed (1 in. deep) of ⅛" diameter steel shot was placed in the bottom of the cylinder on the base screen.

The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate. The cylinder was carefully disassembled to determine whether the materials had in face plated on the screen or sealed the interstices of the shot bed.

Using bagasse as the additive, there was an initial surge of mud followed by a continuous slow dripping of mud for the 10 min. duration of the test. At the end of the test, 81 ml. of mud was collected which had passed through the test cylinder. The filtrate was substantially undiluted.

Using mica flakes (fine) as the additive, there was an initial surge of mud for several seconds followed by a continuous slow dripping of mud for the 10 min. duration of the test. The entire screen surface was saturated with mud and mica. At the end of the test, 74 ml. of mud was collected which had passed through the test cylinder. Plating occurred on the screen, not the slot.

Using nut hulls (mixed types and grades) as the additive, there was an initial surge of mud for several seconds followed by a progressively slower dripping of mud for the 10 min. duration of the test. At the end of the test, 91 ml. of mud was collected which had passed through the test cylinder. The nut hulls did in fact create a bridge within the shot bed, and sealed within it.

EXAMPLE 10

Evaluating Expanded Aggregate Additives Different Conditions

Tests were carried out on a standard drilling mud having a density of 8.5 lb./gal. To 350 ml. of the mud, there was added and mixed in 20 g. of an expanded aggregate as a lost circulation material to be evaluated.

The test cylinder described above was provided with a 60 mesh screen in the base of the cylinder. A bed (1 in. deep) of ⅛" diameter steel shot was placed in the bottom of the cylinder on the base screen.

The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate.

Using Grade #1 (fine) expanded aggregate (expanded clay) as the additive, there was an initial surge of mud for the first few seconds, changing rapidly from mud to thin filtrate, followed by an occasional slow dripping of clear filtrate for about 45 seconds, and no further loss for the 10 min. duration of the test. At the end of the test, 22 ml. of filtrate was collected which had passed through the test cylinder. The material sealed in the shot bed.

Using Grade #2 (medium) expanded aggregate (expanded clay) as the additive, there was an initial surge of mud for the first few seconds, changing rapidly from mud to thin filtrate, followed by an occasional slow dripping of clear filtrate for about 1½ minutes, and no further loss for the 10 min. duration of the test. At the end of the test, 45 ml. of filtrate was collected which had passed through the test cylinder. The material sealed within the shot bed.

Similar results are obtained when like grades of expanded clay-shale or expanded slate are substituted as the expanded aggregate used as a lost circulation additive.

EXAMPLE 11

Evaluating A Control-Different Test Conditions

Tests were carried out on a standard drilling mud having a density of 8.5 lb./gal. The test cylinder described above was provided with a 60 mesh screen in the base of the cylinder. A bed (1 in. deep) of fine sand (80% 0.125 mm. range) was placed in the bottom of the cylinder on the base screen. The cylinder was filled with the drilling mud, sealed and pressurized to 120 psi. In five minutes, 171 ml. of mud and dilute filtrate had passed through the screen.

EXAMPLE 12

Evaluating Prior Art Additives-Different Conditions

Tests were carried out on a standard drilling mud having a density of 8.5 lb./gal. To 350 ml. of the mud, there was added and mixed in 20 g. of a lost circulation material to be evaluated.

The test cylinder described above was provided with a 60 mesh screen in the base of the cylinder. A bed (1 in. deep) of fine sand (80% 0.125 mm. range) was placed in the bottom of the cylinder on the base screen.

The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate.

Using bagasse as the additive, there was an initial surge of mud followed by a continuous slow dripping of dilute filtrate for the first 4-5 minutes with no additional loss for the duration of the 10 minute test. At the end of the test, 122 ml. of mud was collected which had passed through the test cylinder.

Using mica flakes (fine) as the additive, there was an initial surge of mud for several seconds followed by a few slow drips of dilute mud for one minute, with no further loss for the 10 min. duration of the test. At the end of the test, 18 ml. of mud was collected which had passed through the test cylinder.

Using nut hulls (mixed types and grades) as the additive, there was a small initial surge of mud for one or two seconds followed by a slow dripping of dilute filtrate for 15-20 seconds and no more for the 10 min. duration of the test. At the end of the test, 20 ml. of mud was collected which had passed through the test cylinder.

EXAMPLE 13

Evaluating Expanded Aggregate Additives Different Conditions

Tests were carried out on a standard drilling mud having a density of 8.5 lb./gal. To 350 ml. of the mud, there was added and mixed in 20 g. of an expanded aggregate as a lost circulation material to be evaluated.

The test cylinder described above was provided with a 60 mesh screen in the base of the cylinder. A bed (1 in. deep) of fine sand (80% 0.125 mm. range) was placed in the bottom of the cylinder on the base screen.

The cylinder was filled with the drilling mud, sealed and pressurized to 120 psi, and the resulting filtrate was collected in the measuring cup to determine its volume and characteristics. Notes were made as to the consistency of the liquid, i.e. whether it was actually mud or a dilute filtrate.

Using Grade #1 (fine) expanded aggregate (expanded clay) as the additive, there was no filtrate passed for the 10 min. duration of the test. At the end of the test, no filtrate was collected which had passed through the test cylinder.

Using Grade #2 (medium) expanded aggregate (expanded clay) as the additive, there was an initial drop of dilute mud and no further loss for the 10 min. duration of the test. At the end of the test, less than 1 ml. of filtrate was collected which had passed through the test cylinder.

Similar results are obtained when like grades of expanded clay-shale or expanded slate are substituted as the expanded aggregate used as a lost circulation additive.

EXAMPLE 14

Evaluating A Control-Different Test Conditions

Tests were carried out on a standard drilling mud having a density of 8.5 lb./gal. The test cylinder described above was provided with a 60 mesh screen in the base of the cylinder. A bed (1 in. deep) of coarse (80% in 0.5-2 mm. range) sand was placed in the bottom of the cylinder on the base screen. The cylinder was filled with the drilling mud, sealed and pressurized to 120 psi. In five minutes, 211 ml. of the mud had passed through the screen.

EXAMPLE 15

Evaluating Prior Art Additives-Different Conditions

Tests were carried out on a standard drilling mud having a density of 8.5 lb./gal. To 350 ml. of the mud, there was added and mixed in 20 g. of a lost circulation material to be evaluated.

The test cylinder described above was provided with a 60 mesh screen in the base of the cylinder. A bed (1 in. deep) of coarse (80% in 0.5-2 mm. range) sand was placed in the bottom of the cylinder on the base screen.

The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate.

Using bagasse as the additive, there was an initial surge of mud followed by a continuous slow dripping of mud for the 10 min. duration of the test. At the end of the test, 61 ml. of mud was collected which had passed through the test cylinder.

Using mica flakes (fine) as the additive, there was an initial surge of mud for several seconds followed by a continuous slow dripping of filtrate for the first two minutes of the 10 min. duration of the test. At the end of the test, 59 ml. of mud was collected which had passed through the test cylinder.

Using nut hulls (mixed types and grades) as the additive, there was an initial surge of mud for several seconds followed by a slow dripping of dilute mud for 3-4 minutes of the 10 min. duration of the test. At the end of the test, 41 ml. of mud was collected which had passed through the test cylinder.

EXAMPLE 16

Evaluating Expanded Aggregate Additives Different Conditions

Tests were carried out on a standard drilling mud having a density of 8.5 lb./gal. To 350 ml. of the mud, there was added and mixed in 20 g. of an expanded aggregate as a lost circulation material to be evaluated.

The test cylinder described above was provided with a 60 mesh screen in the base of the cylinder. A bed (1 in. deep) of coarse (80% in 0.5-2 mm. range) sand was placed in the bottom of the cylinder on the base screen.

The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate.

Using Grade #1 (fine) expanded aggregate (expanded clay) as the additive, there was an initial surge of mud for the first few seconds, changing rapidly from mud to thin filtrate within 15 seconds, with no further loss for the 10 min. duration of the test. At the end of the test, 9 ml. of filtrate was collected which had passed through the test cylinder.

Using Grade #2 (medium) expanded aggregate (expanded clay) as the additive, there was an initial surge of mud for the first few seconds, changing rapidly from mud to thin filtrate, followed by an occasional slow dripping of clear filtrate for about one minute, with no further loss for the 10 min. duration of the test. At the end of the test, 16 ml. of filtrate was collected which had passed through the test cylinder.

Similar results are obtained when like grades of expanded clay-shale or expanded slate are substituted as the expanded aggregate used as a lost circulation additive.

EXAMPLE 17

Evaluating A Control-Different Test Conditions

Tests were carried out on a standard drilling mud having a density of 8.5 lb./gal. The test cylinder described above was provided with a 40 mesh screen in the base of the cylinder. A bed (2 in. deep) of coarse angular fractured gravel was placed in the bottom of the cylinder on the base screen. The cylinder was filled with the drilling mud, sealed and pressurized to 120 psi. In five minutes, substantially all of the mud had passed through the screen.

EXAMPLE 18

Evaluating Prior Art Additives-Different Conditions

Tests were carried out on a standard drilling mud having a density of 8.5 lb./gal. To 350 ml. of the mud, there was added and mixed in 20 g. of a lost circulation material to be evaluated.

The test cylinder described above was provided with a 40 mesh screen in the base of the cylinder. A bed (2 in. deep) of coarse angular fractured gravel was placed in the bottom of the cylinder on the base screen.

The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate, and the cylinder was carefully disassembled to determine whether plating had taken place on the screen or within the gravel bed. It is believed that the angularity of the gravel created a fissure-like matrix which may have accounted for the high values in this test..

Using bagasse as the additive, there was an initial surge of mud followed by a continuous drip of mud for the 10 min. duration of the test. There was some retention within the gravel, but most retention was on the screen. At the end of the test, 124 ml. of mud was collected which had passed through the test cylinder.

Using mica flakes (fine) as the additive, there was an initial surge of mud for several seconds followed by a continuous slow dripping of mud for the 10 min. duration of the test. The entire screen surface was saturated with mud and mica. Retention was almost entirely on the screen. At the end of the test, 68 ml. of mud was collected which had passed through the test cylinder.

Using nut hulls (mixed types and grades) as the additive, there was an initial surge of mud for several seconds followed by a continuous slow dripping of mud for the 10 min. duration of the test. At the end of the test, 72 ml. of mud was collected which had passed through the test cylinder. Some sealing had occurred within the gravel formation.

EXAMPLE 19

Evaluating Expanded Aggregate Additives Different Conditions

Tests were carried out on a standard drilling mud having a density of 8.5 lb./gal. To 350 ml. of the mud, there was added and mixed in 20 g. of an expanded aggregate as a lost circulation material to be evaluated.

The test cylinder described above was provided with a 40 mesh screen in the base of the cylinder. A bed (2 in. deep) of coarse angular fractured gravel was placed in the bottom of the cylinder on the base screen.

The cylinder was filled with the drilling mud, sealed and pressurized to 120 psi. and the resulting filtrate was collected in the measuring cup to determine its volume and characteristics. Notes were made as to the consistency of the liquid, i.e. whether it was actually mud or a dilute filtrate.

Using Grade #1 (fine) expanded aggregate (expanded clay) as the additive, there was an initial surge of mud for the first few seconds, changing rapidly from mud to thin filtrate, followed by an occasional slow dripping (about 30 sec. intervals) of clear filtrate for all of the 10 min. duration of the test. At the end of the test, 29 ml. of filtrate was collected which had passed through the test cylinder. a substantial amount of the plating was on the screen.

Using Grade #2 (medium) expanded aggregate (expanded clay) as the additive, there was an initial surge of mud for the first few seconds, changing rapidly from mud to thin filtrate, followed by an occasional slow dripping (about 25-30 sec. intervals) of clear filtrate for 3-4 minutes of the 10 min. duration of the test. At the end of the test, 17 ml. of filtrate was collected which had passed through the test cylinder. This grade of the expanded aggregate sealed primarily within the gravel bed.

Similar results are obtained when like grades of expanded clay-shale or expanded slate are substituted as the expanded aggregate used as a lost circulation additive.

SOME SPECIAL OBSERVATIONS

Except where coarse gravel beds were used in the test cylinder, no additional benefits were evident in small scale testing in using large amounts of expanded aggregate per barrel. In that instance, quantities up to 50 lb. per barrel were useful. Using the coarse Grades initially, followed by finer Grades and finishing off with "fines" produced a perfect, tight, smooth seal.

While virtually all of the testing was done at pressures of 120 psi., the use of higher pressures up to 850 psi. (the practical pressure limit for the equipment) shows that higher pressures create a faster seal and a more permanent one. When higher pressures are used, there is almost no initial surge through the test apparatus since the chemical/physical bond is obtained almost instantly. It is therefore concluded that materials which are found effective in the small scale test apparatus are effective in field application.

ADDITIVES FOR CEMENT SLURRIES

EXAMPLE 20

Evaluating A Control

Tests were carried out on a cement slurry having a density of 14.6 lb./gal. The test cylinder described above was provided with a 20 mesh screen in the base of the cylinder. The cylinder was filled with the slurry, sealed and pressurized to 120 psi. In five minutes, substantially all of the cement slurry had passed through the screen.

EXAMPLE 21

Evaluating Prior Art Additives

Tests were carried out on a cement slurry having a density of 14.6 lb./gal. To 350 ml. of the slurry, there was added and mixed in 20 g. of a lost circulation material to be evaluated.

The test cylinder described above was provided with a 20 mesh screen in the base of the cylinder. The cylinder was filled with the cement slurry, sealed and pressurized to 120 psi. and the resulting filtrate was collected in the measuring cup to determine its volume and characteristics. Notes were made as to the consistency of the liquid, i.e. whether it was actually cement slurry or a dilute filtrate.

Using bagasse as the additive, there was an initial surge of watery liquid for the first 15–20 sec. followed by a continuous slow dripping of the slurry for the 10 min. duration of the test. At the end of the test, 94 ml. of the liquid was collected which had passed through the test cylinder.

Using mixed nut hulls (various grades) as the additive, there was an initial surge of watery liquid for several seconds followed by a continuous slow dripping of the slurry for two minutes, with one or two drops occurring during the remainder of the 10 min. test. At the end of the test, 62 ml. of the liquid was collected which had passed through the test cylinder.

EXAMPLE 22

Evaluating Expanded Aggregate Additives

Tests were carried out on a cement slurry having a density of 14.6 lb./gal. To 350 ml. of the slurry, there was added and mixed in 20 g. of an expanded aggregate as a lost circulation material to be evaluated.

The test cylinder described above was provided with a 20 mesh screen in the base of the cylinder. The cylinder was filled with the cement slurry, sealed and pressurized to 120 psi. and the resulting filtrate was collected in the measuring cup to determine its volume and characteristics. Notes were made as to the consistency of the liquid, i.e. whether it was actually the cement slurry or a dilute filtrate.

Using Grade #1 (fine) expanded aggregate (expanded clay) as the additive, there were a few drops of liquid for the first 5–10 sec. with no further filtrate for the remainder of the 10 min. test. At the end of the test, 4 ml. of filtrate was collected which had passed through the test cylinder.

Using Grade #2 (medium) expanded aggregate (expanded clay) as the additive, there were a few drops of liquid for the first 10 seconds, with no additional filtrate for the 10 min. duration of the test. At the end of the test, 6 ml. of filtrate was collected which had passed through the test cylinder.

Similar results are obtained when like grades of expanded clay-shale or expanded slate are substituted as the expanded aggregate used as a lost circulation additive.

FIELD APPLICATION OF THE EXPANDED AGGREGATES

The following examples illustrate typical procedures for field application of the lost circulation additives of this invention.

EXAMPLE 23

Slug Application

While drilling at 6300 feet, a highly fractured formation is encountered and circulation of the drilling mud is rapidly lost into the formation. Several commercial additives are tried in an attempt to stop the loss but without success. Then, 350 cu.ft. of an equal mixture of Grades #1 and #2 expanded aggregate (expanded clay) are mixed with 100 bbl. of standard drilling mud and introduced as a slug and spotted to the lost circulation zone. The circulation loss ceases in a short time. Another slug of mud and expanded aggregate "fines" is spotted to the lost circulation zone and the surface of the well bore refinished to facilitate the restarting of normal drilling operation.

EXAMPLE 24

Continuous Feed Application

While drilling at 4900 feet, intermittently fractured formations are encountered. Commercial additives are found to give only marginal aid in controlling circulation loss. Suddenly a rapid and serious loss of circulation begins to occur. Grade #3 expanded aggregate (expanded clay-shale) is added to the regular drilling mud at a rate of 25 lb. per ballel. The circulation loss starts to slow up in a short time. The coarse expanded aggregate which circulates back to the surface is recovered. Next, Grade #2 expanded aggregate is substituted as the lost circulation additive, at about 20 lb. per ballel, and the circulation loss continuous to slow. After several hours, Grade #1 expanded aggregate is substituted as the lost circulation additive and the circulation loss ceases. Then, expanded aggregate "fines" are added at about 20 lb. per barrel to finish the surface of the now plugged lost circulation zone. Afterwards, for several days, Grade #1 expanded aggregate is continuously added to the mud at a level of about 26 lb. per barrel. No further circulation losses are encountered, although the rock cuttings continue to indicate that the well bore is penetrating a highly fractured formation.

While this invention has been fully and completely described, with special emphasis upon several preferred embodiments, it should be understood that within the scope of the appended claims this invention may be practiced otherwise than as specifically described herein.

I claim:

1. A drilling fluid for sealing a lost circulation zone penetrated by a well bore comprising
    a slurry of at least one particulate expanded aggregate selected from the group consisting of expanded clay, expanded slate or expanded clay shale in a material selected from the group consisting of drilling muds and cement slurries,
    said expanded aggregate being present in said slurry in a selected amount sufficient to seal the openings or pores in said lost circulation zone.
2. A drilling fluid according to claim 1 in which
    said expanded aggregate slurry is a slurry in a water-base or an oil base drilling mud.
3. A drilling fluid according to claim 1 in which
    said expanded aggregate slurry is a slurry in a water-base drilling mud.
4. A drilling fluid according to claim 1 in which
    said expanded aggregate slurry is a slurry in an oil base drilling mud.

5. A drilling fluid according to claim 1 in which said expanded aggregate slurry is a mixture of expanded aggregate with a cement slurry.

6. A drilling fluid according to claim 2 in which said expanded aggregate comprises from 1 to 33 parts by weight per 100 parts by weight of said drilling mud.

7. A drilling fluid according to claim 5 in which said expanded aggregate comprises from 1 to 33 parts by weight per 100 parts by weight of said said cement slurry.

8. A drilling fluid according to claim 2 in which said expanded aggregate comprises from 1 to 33 parts by weight per 100 parts by weight of said drilling mud admixed with another lost circulation additive.

9. A drilling fluid according to claim 5 in which said expanded aggregate comprises from 1 to 33 parts by weight per 100 parts by weight of said cement slurry, admixed with another lost circulation additive.

* * * * *